3,110,684
HUMIDIFIER PRESERVATIVE
Leo D. Miller, 332 E. Grand St., Mount Vernon, N.Y.
No Drawing. Filed Dec. 22, 1959, Ser. No. 861,184
1 Claim. (Cl. 252—389)

This invention relates to a preservative for humidifiers used in heating equipment and more particularly to an inhibitor which will prevent the formation of rust, corrosion, scale, algae and bacteria in a humidifier for heating equipment adapted for use in hot air or forced air heating systems.

In the use of heating equipment which is designed specifically for heating homes and other buildings by means of forcing preheated air through ducts that carry this air throughout the building, it is essential that the heating units themselves be equipped with a humidifier. The reason for this is because in the absence of the provision of humidifying means, the heated air contains no moisture which, it is well known, constitutes a menace to health. The humidifiers are so located in the heating unit as to permit the hot air currents to become uniformly moistened by the water in the humidifier and to this end they have been and are constructed so as to permit maximum possible exposure of the moisture to the air currents. The humidifiers are constructed, for the most part, of ferrous and non-ferrous materials, such as copper, zinc, brass, and the like.

In the operation of the humidifiers various difficulties have arisen. For example, because they are exposed in the presence of water to a great deal of oxygen in the current of air, rust, corrosion and scale accumulates and becomes hardened on the metallic surfaces of the humidifier. In addition the wicks, and other means within the humidifier which intersect the air currents themselves, become clogged with scale and their efficiency is greatly impaired. Further the floats which provide for the continuous supply of water from the feeders to the humidifiers become corroded and rusted and thereby are rendered inoperative.

All natural water contains a certain amount of salts and as the water is evaporated in the humidifier, there is left behind especially in hard water deposits of calcium and magnesium salts and the like. These deposits form an insoluble scale and thus tend to further clog and complicate the equipment. All of the above conditions arise when the heating unit is in fairly constant use. On the other hand, when the heating units are inactive or under limited activity, it is obvious that the water becomes stagnant and often putrefaction sets in under which conditions growths or algae become apparent. A further result is stagnant, rusty and dirty water with consequent clogging of the equipment by insoluble accumulations whereby the equipment is made inoperative.

To eliminate this problem artificial coatings, as for example, paints, enamels, porcelainized materials, have been placed on the humidifiers. However, such constructions only are partially effective for the algae nevertheless forms in periods of inactivity and scaling in periods of activity has not been prevented and gradually the coating breaks down with consequent rust and corrosion occurrences taking place again. Further most humidifiers are still made of metals unprotected by coatings of this type.

Accordingly, it is an object of the present invention to provide a rust, corrosion, scale and algae inhibitor for use in humidifiers for heating units and the like.

A further object of the present invention is to provide such an inhibitor and humidifier preservative which can be made in liquid solution, powder, crystal or compressed or molded solid of any geometrical shape.

A still further object of the present invention is to provide an inhibitor of the above described character which will prevent the formation of rust and corrosion on exposed metal surfaces.

A still further object of the present invention is to provide an inhibitor of the character described which prevents growth of bacteria or algae and slime in stagnant water.

A feature of my inhibitor of the character described is that it will prolong the life of a humidifier by eliminating rust and corrosion.

A further feature of my inhibitor is that it prevents the deposit of scale on the metallic surfaces.

A further feature of my inhibitor is that it is economical to manufacture and easy to utilize.

A still further feature of my inhibitor is that it does not affect in any way the operativeness of the humidifier with which it is used. Additionally my novel inhibitor eliminates the use of coatings for the humidifiers.

Other objects and advantages of the present invention are more apparent in the description following.

My novel inhibitor which is used to prevent the corrosion of and rust formation on exposed metal surfaces and to prevent the growth of bacteria or algae in stagnant water in a humidifier, contains 30% to 50% by weight of a rust inhibiting alkaline salt, for example, sodium silicate, sodium nitrite, sodium nitrate, sodium chromate, sodium chlorate, or sodium carbonate, or potassium silicate, potassium nitrite, potassium nitrate, etc., or ammonium silicate, etc., or lithium silicate, etc., together with 30% to 50% by weight of a sequestering or chelating agent, as for example, a sodium salt of phosphoric acid, such as tetrasodium pyrophosphate, sodium citrate or sodium gluconate, a potassium salt of phosphoric acid, potassium citrate, etc., or an ammonium salt of phosphoric acid, ammonium citrate, etc., citric acid or gluconic acid or ethylene diamine tetra acetic acid; and 10% to 30% by weight of a preservative agent, as for example, sodium benzoate, ammonium benzoate or lithium benzoate.

The inhibitor of my invention is soluble in water and may be made in the form of a solid tablet or stick by molding or compressing the above ingredients together with a binder such as propylene glycol or powdered gelatin. The inhibitor is equally useful and advantageous when manufactured as a solution or as a powder. In any form as above, it is dropped into the water or mixed with the water in the humidifier. When it is in solid shape, of course, it will dissolve.

Upon the dissolution of my inhibitor in the water in the humidifier, the rust inhibiting alkaline salt, alkalizes the water and any corrosion or rust process tends to cease. In addition because certain of the ingredients set forth in my composition complexes with iron ions, these metallic ions are inactivated in their tendency to be deposited as an insoluble crust or scale. Thus it will be understood that while the heating unit is in use, the humidifier preservative of my invention prevents corrosion and tuberculation of the exposed metal surfaces. The sequestering or chelating agent in my inhibitor complexes with the calcium and magnesium salts whereby they are not deposited in an insoluble or scaly form on the metallic surfaces. During this period of active use their is little, if any, resultant stagnation and putrefaction of the water which is under constant agitation. However, in most climates there are periods when heating units of this type are inactive and during these periods algae and bacteria form in the unagitated water in the humidifier. During these periods my inhibitor has been found extremely advantageous with respect to its benzoate preservative agent content in actively preventing the growth of bacteria and algae for the reason that putrefaction of the stagnant water is eliminated. The preservative agent exemplifier as benzoate, it has been found, also acts as the stabilizer for the inhibitor of my invention. It will be understood that the preservative agent may comprise a phenolic compound, a silicate, glycerine, glycol or similar products.

It will be understood that while the invention has been described in its applicability to heating units, it may be equally advantageously used in other humidifying units not necessarily operating with a heating unit.

While the invention has been described in some detail, it is to be understood that the examples are given by way of illustration only and are not to be considered limited in any way. The illustrated ingredients may be replaced by equivalents and the amounts thereof may be varied within wide limits.

I claim:

A preservative for humidifiers for heating units consisting essentially of between 30% to 50% by weight of sodium nitrite as a rust inhibitor, between 30% to 50% by weight of ethylene diamine tetra acetic acid as a sequestering agent and between 10% to 30% glycerine as a preservative.

References Cited in the file of this patent

UNITED STATES PATENTS

| | | |
|---|---|---|
| 2,038,724 | Eichengrun | Apr. 28, 1936 |
| 2,264,389 | Lamprey | Dec. 2, 1941 |
| 2,478,755 | Eider | Aug. 9, 1949 |
| 2,481,977 | Cinamon | Sept. 13, 1949 |
| 2,728,652 | Hance | Dec. 27, 1955 |
| 2,739,870 | Senkus | Mar. 27, 1956 |

OTHER REFERENCES

The Condensed Chemical Dictionary, 5th Ed., Reinhold Pub. Corp. (1956). Pages 456, 457, 526 and 527.